US010580294B2

(12) United States Patent
Bedard

(10) Patent No.: US 10,580,294 B2
(45) Date of Patent: Mar. 3, 2020

(54) PHOTOGRAPHIC SYSTEM FOR USE ON SCHOOL BUSES

(71) Applicant: Jacques Bedard, Quebec (CA)

(72) Inventor: Jacques Bedard, Quebec (CA)

( * ) Notice: Subject to any disclaimer, the term of this patent is extended or adjusted under 35 U.S.C. 154(b) by 0 days.

(21) Appl. No.: 15/810,188

(22) Filed: Nov. 13, 2017

(65) Prior Publication Data

US 2018/0137753 A1 May 17, 2018

(30) Foreign Application Priority Data

Nov. 14, 2016 (GB) .................................. 1619284.1

(51) Int. Cl.
| | |
|---|---|
| *B60Q 1/00* | (2006.01) |
| *B60Q 1/46* | (2006.01) |
| *G08G 1/01* | (2006.01) |
| *G08G 1/04* | (2006.01) |
| *G08G 1/16* | (2006.01) |
| *G06Q 10/00* | (2012.01) |
| *G06Q 50/30* | (2012.01) |
| *G08G 1/017* | (2006.01) |
| *G08G 1/052* | (2006.01) |

(Continued)

(52) U.S. Cl.
CPC ......... *G08G 1/0175* (2013.01); *B60Q 1/0023* (2013.01); *B60Q 1/46* (2013.01); *G06Q 40/00* (2013.01); *G06Q 50/30* (2013.01); *G08G 1/0112* (2013.01); *G08G 1/0129* (2013.01); *G08G 1/0133* (2013.01); *G08G 1/04* (2013.01); *G08G 1/052* (2013.01); *G08G 1/054* (2013.01); *G08G 1/167* (2013.01); *H04N 5/247* (2013.01)

(58) Field of Classification Search
CPC ........ G08G 1/167; G08G 1/166; G08G 1/052; G08G 1/0175; G08G 1/0112; G08G 1/054; G08G 1/0129; G08G 1/04; B60Q 1/46; B60Q 1/0023; B60Q 1/525
See application file for complete search history.

(56) References Cited

U.S. PATENT DOCUMENTS

| | | | | |
|---|---|---|---|---|
| 5,382,953 A | * | 1/1995 | Hauptli | B60Q 1/50 340/433 |
| 5,510,764 A | * | 4/1996 | Hauptli | B60Q 1/50 340/433 |

(Continued)

FOREIGN PATENT DOCUMENTS

| | | | | |
|---|---|---|---|---|
| DE | 4420560 A1 | * | 2/1995 | ........... G07C 5/0891 |
| DE | 202006018416 U1 | * | 2/2007 | ............. G08G 1/054 |
| JP | 2015197836 A | * | 11/2015 | |

OTHER PUBLICATIONS

Seon Inc.; "Predictive Stop Arm" webpage, 2018, <https://www.seon.com/products/intelligent-perimeter-safety-solutions/predictive-stop-arm> (Year: 2018).*

*Primary Examiner* — John Villecco

(57) ABSTRACT

A photographic system for use on school buses allowing traffic authorities to issue citations for violations of school bus traffic laws which require drivers to stop when a school bus turns on its flashers. Doppler devices are activated when the flashers are turned on. The Doppler devices detect for vehicle motion and speed facilitating a camera to take a series of snapshots. The snapshots along with locational and time data are sent to the authorities. The photographic system is designed to improve awareness and safety around school buses when loading and unloading school children.

11 Claims, 7 Drawing Sheets

(51) Int. Cl.
   *G08G 1/054*    (2006.01)
   *H04N 5/247*    (2006.01)
   *G06Q 40/00*    (2012.01)

(56) References Cited

U.S. PATENT DOCUMENTS

| | | | | |
|---|---|---|---|---|
| 5,896,167 A * | 4/1999 | Omae | ................... | G08G 1/054 |
| | | | | 348/143 |
| 6,433,706 B1 | 8/2002 | Anderson, III et al. | | |
| 6,681,195 B1 * | 1/2004 | Poland | ..................... | G01P 3/38 |
| | | | | 700/159 |
| 6,738,089 B1 * | 5/2004 | Silc | ........................ | B60R 11/00 |
| | | | | 348/143 |
| 7,633,382 B2 * | 12/2009 | Bowler | ............... | B60Q 1/0023 |
| | | | | 340/433 |
| 8,258,981 B2 * | 9/2012 | Turnbull | ............... | B60Q 1/525 |
| | | | | 180/167 |
| 8,599,260 B1 * | 12/2013 | Vaughn | ................ | G08G 1/0175 |
| | | | | 348/149 |
| 8,761,443 B2 * | 6/2014 | Howard | ............ | G06K 9/00791 |
| | | | | 340/433 |
| 9,019,380 B2 * | 4/2015 | Schenken | ............ | G08G 1/0175 |
| | | | | 348/149 |
| 9,466,210 B2 * | 10/2016 | Arpin | ..................... | H04N 5/772 |
| 9,754,484 B2 * | 9/2017 | Schenken | ............ | G08G 1/0175 |
| 9,786,171 B2 * | 10/2017 | Prokhorov | ........... | G08G 1/0965 |
| 2006/0269105 A1 | 11/2006 | Langlinais | | |
| 2009/0195651 A1 | 8/2009 | Leonard et al. | | |
| 2012/0063737 A1 * | 3/2012 | Gregoire | .................. | H04N 5/76 |
| | | | | 386/224 |
| 2012/0177336 A1 * | 7/2012 | Bhan | ...................... | H04N 5/77 |
| | | | | 386/224 |
| 2013/0044219 A1 | 2/2013 | Burry et al. | | |
| 2014/0257630 A1 * | 9/2014 | Ruiz | ....................... | E05B 77/54 |
| | | | | 701/36 |

* cited by examiner

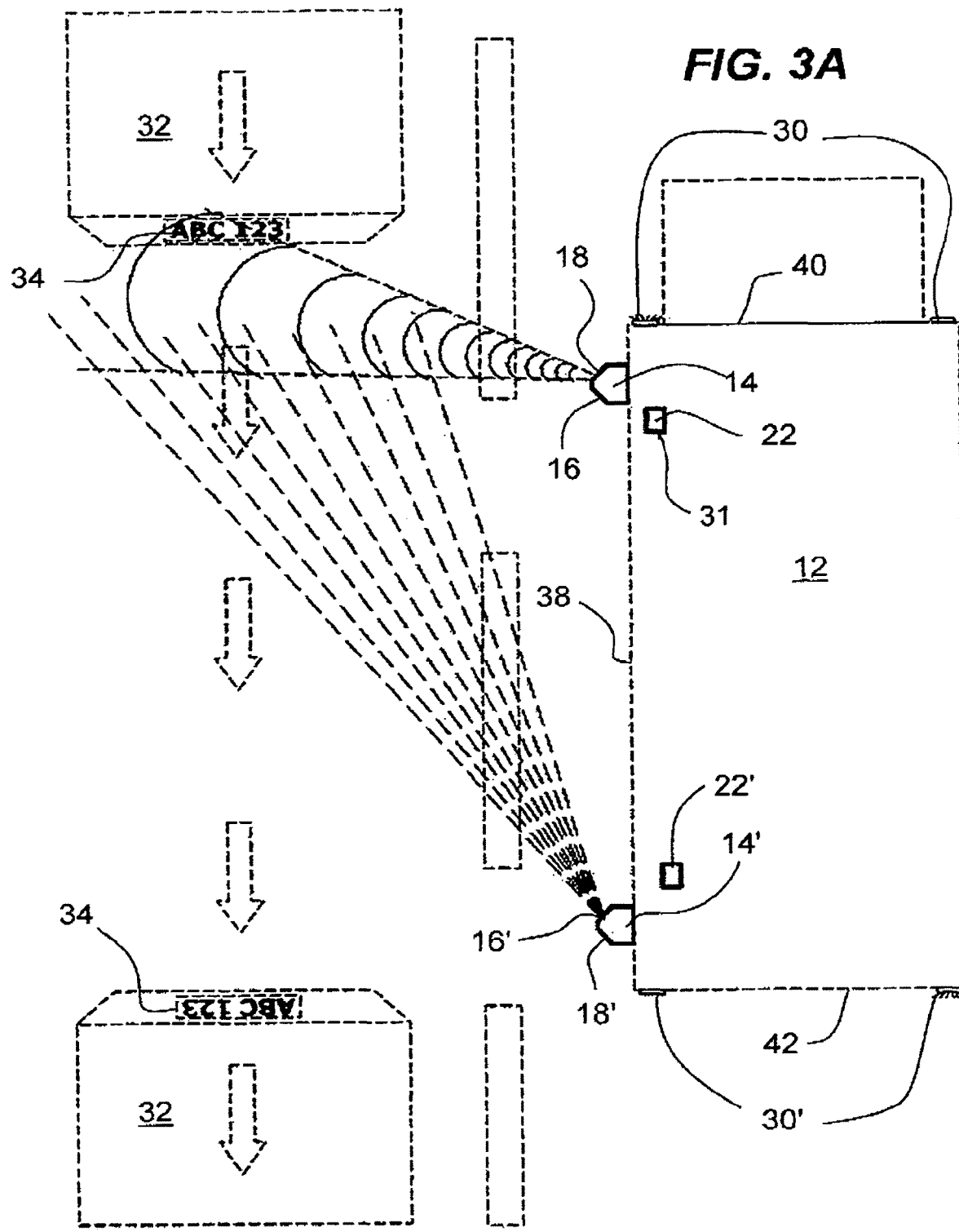

PHOTOGRAPHIC SYSTEM FOR USE ON SCHOOL BUSES

CROSS-REFERENCE TO RELATED APPLICATIONS

The present application claims priority to United Kingdom Patent Application serial number GB1619284.12, filed on Nov. 14, 2016 entitled "Photographic system for use on school buses", the disclosure of which is hereby incorporated in its entirety at least by reference.

BACKGROUND OF THE INVENTION

1. Field of the Invention

The present invention generally relates to motion detectors utilized with a photo taking system, but more particularly to a photographic system for use on school buses.

2. Description of Related Art

It is well known, that when operating a vehicle the driver of that vehicle must stop when a school bus is parked for loading and unloading children and displays or has recently displayed a stop signal arm. Although there are laws in many jurisdictions regarding the obligation of drivers to stop their vehicle when approaching a school bus in this capacity, there are still many drivers who forget to stop. This is very unsafe driving behavior. Consequently, there should be a system to keep track of those offenders allowing traffic authorities to issue a citation for the violation to improve awareness and safety.

BRIEF SUMMARY OF THE INVENTION

In one embodiment a photographic system for use on a school bus is provided, comprising a control unit located in the school bus; at least one container connected to the control unit, wherein the at least one container includes a camera, a Doppler device, a microprocessor, a memory storage unit, and a GPS unit; and a number of flashers positioned on a front portion and a back portion of the school bus, as are usually found on school bus, and wherein the number of flashers are connected to the control unit such that when the number of flashers are turned on by a school bus driver, the Doppler device is activated for vehicle motion detection.

In one embodiment, the at least one container is a first container and a second container. In one embodiment, the first container is positioned on a first side of the school bus adjacent to the front portion of the school bus and the second container is positioned on the first side of the school bus adjacent to the back portion of the school bus. In another embodiment, the Doppler device is configured to send signals to the microprocessor to initiate a series of snapshots of a license plate of a vehicle via the camera. In one embodiment, the license plate is a rear license plate. In one embodiment, the vehicle is an oncoming vehicle towards the front portion of the school bus or an approaching vehicle towards the back portion of the school bus, wherein the oncoming or approaching vehicle is not decelerating to a stop at a predetermined distance from the school bus. In yet another embodiment, the Doppler device is configured to determine the vehicle's speed and the GPS unit is configured to determine locational data including GPS coordinates and time data.

In one embodiment, the series of snapshots, the vehicle's speed, and locational data are stored on the memory storage unit and sent over the Internet to local authorities via a transmitter. In another embodiment, the microprocessor is configured to determine a best time to trigger the series of snapshots. In one embodiment, the license plate is a front license plate.

In another aspect of the invention, a photographic system for use on a school bus is provided, comprising a control unit located in the school bus; a first container and a second container each having a camera and a Doppler device connected to the control unit, wherein the first container is positioned on a first side of the school bus adjacent to a front portion of the school bus and the second container is positioned on the first side of the school bus adjacent to a back portion of the school bus; wherein at least one of the first or second containers include a microprocessor, a memory storage unit, and a GPS unit; a number of flashers positioned on the front portion and the back portion of the school bus, wherein the number of flashers are connected to the control unit such that when the number of flashers are turned on by a school bus driver, the Doppler devices are activated; the Doppler devices are configured to work together and send signals to the microprocessor when detecting an oncoming or approaching vehicle that is not decelerating at a predetermined distance from the school bus; the microprocessor is configured to determine a best time to initiate a series of snapshots of a license plate of the vehicle via the cameras, wherein the best time is based on the signals sent by the Doppler devices; and the Doppler devices are configured to determine the oncoming or approaching vehicle's speed and the GPS unit is configured to determine locational data including GPS coordinates and time data, wherein the series of snapshots, the vehicle's speed, and locational data are configured to be stored on the memory storage unit and sent over the Internet to local authorities via a transmitter.

In yet another aspect of the invention a method of using a photographic system for use on a school bus when school bus flashers are actuated is provided, the method comprising steps (a) activating, with a control unit, at least one Doppler device; (b) determining, with the at least one Doppler device, if an approaching or an oncoming vehicle is not decelerating to a stop at a predetermined distance from the school bus; (c) determining, with a microprocessor, a best time to take a series of snapshots of the approaching or oncoming vehicle based on the vehicle's speed at the predetermined distance; (d) taking, with at least one camera, the series of snapshots of a license plate of the approaching or oncoming vehicle; (e) recording, with the at least one Doppler device, the vehicle's speed; (f) recording, with a GPS unit, the GPS coordinates and time data of the approaching or oncoming vehicle; (g) storing, with a memory storage unit, the series of snapshots, the vehicle's speed, the GPS coordinates, and the time data; and (h) transmitting, with a transmitter, the series of snapshots, the vehicle's speed, the GPS coordinates, and the time data to local authorities over the Internet.

In one embodiment, in step (d), the license plate is a rear license plate. In another embodiment, in step (d), the license plate is a front license plate.

BRIEF DESCRIPTION OF THE SEVERAL VIEWS OF THE DRAWINGS

Other features and advantages of the present invention will become apparent when the following detailed description is read in conjunction with the accompanying drawings, in which:

FIGS. 3A-B are top views showing the two steps in the photographic sequence for use on school buses according to an embodiment of the present invention.

DETAILED DESCRIPTION OF THE PREFERRED EMBODIMENT

The following description is provided to enable any person skilled in the art to make and use the invention and sets forth the best modes contemplated by the inventor of carrying out their invention. Various modifications, however, will remain readily apparent to those skilled in the art, since the general principles of the present invention have been defined herein to specifically provide a photographic system for use on school buses.

Figure 1A:
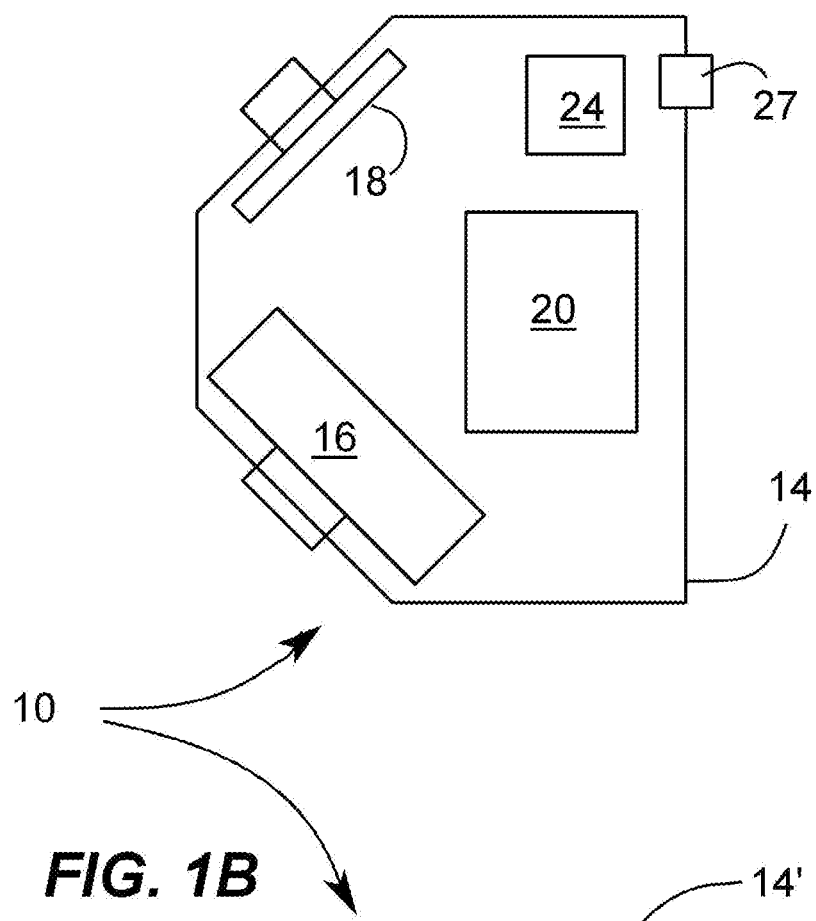
FIGS. 1A-B are schematic top views of a first and a second container of the photographic system for use on school buses according to an embodiment of the present invention.
Figure 1B:
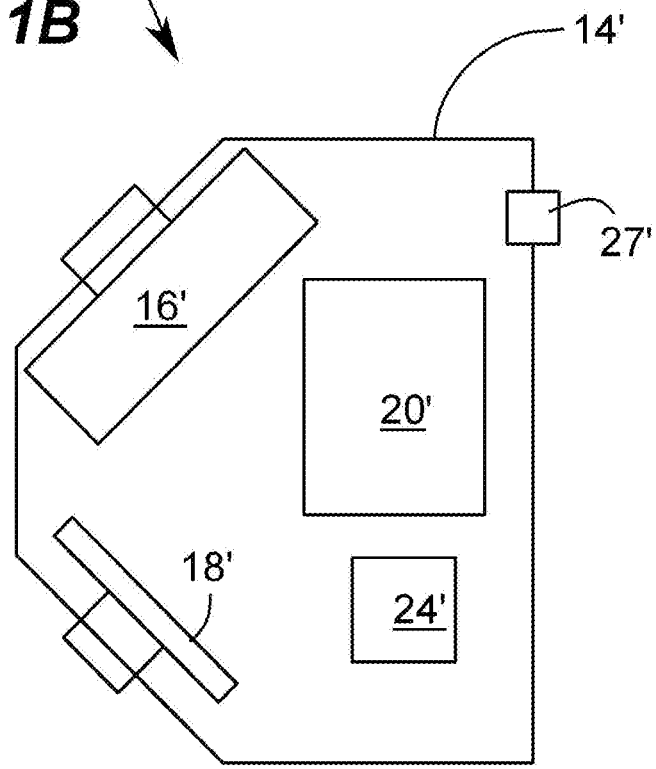

FIGS. 1A-B are schematic top views of a first and a second container 14/14' of a photographic system 10 for use on school buses according to an embodiment of the present invention. Referring now to FIGS. 1A-B, the first and second containers are illustrated. In one embodiment, each container comprises a camera 16/16' and a Doppler device 18/18' configured to determine the presence and speed of a vehicle. In one embodiment, the Doppler device is a Doppler radar utilizing the Doppler effect as well known in the art. In one embodiment, each container further comprises a printed circuit board (PCB) 20/20' and a memory storage unit 24/24' which will be discussed in further detail below.

In one embodiment, the first and second containers are in communication with each other. In alternative embodiments, the first and second containers operate independently. In one embodiment, each container includes a connection element 27/27', wherein the connection element provides power and is used to transfer data, such as a USB cable connection as well known in the art. In an alternate embodiment, only one connection element is provided on either the first or second container, in situations where the first and second containers operate independently. In one embodiment, a heating and thermostat unit 33 is provided for controlling the temperature of the PCB electronics, as well as any glasses or lenses from the cameras and equipment. Best seen in FIGS. 3A-D, the first container is positioned on a first side 38 of the school bus adjacent to a front portion 40 of the school bus and the second container is positioned on the first side of the school bus adjacent to a back portion 42 of the school bus.

Figure 2:
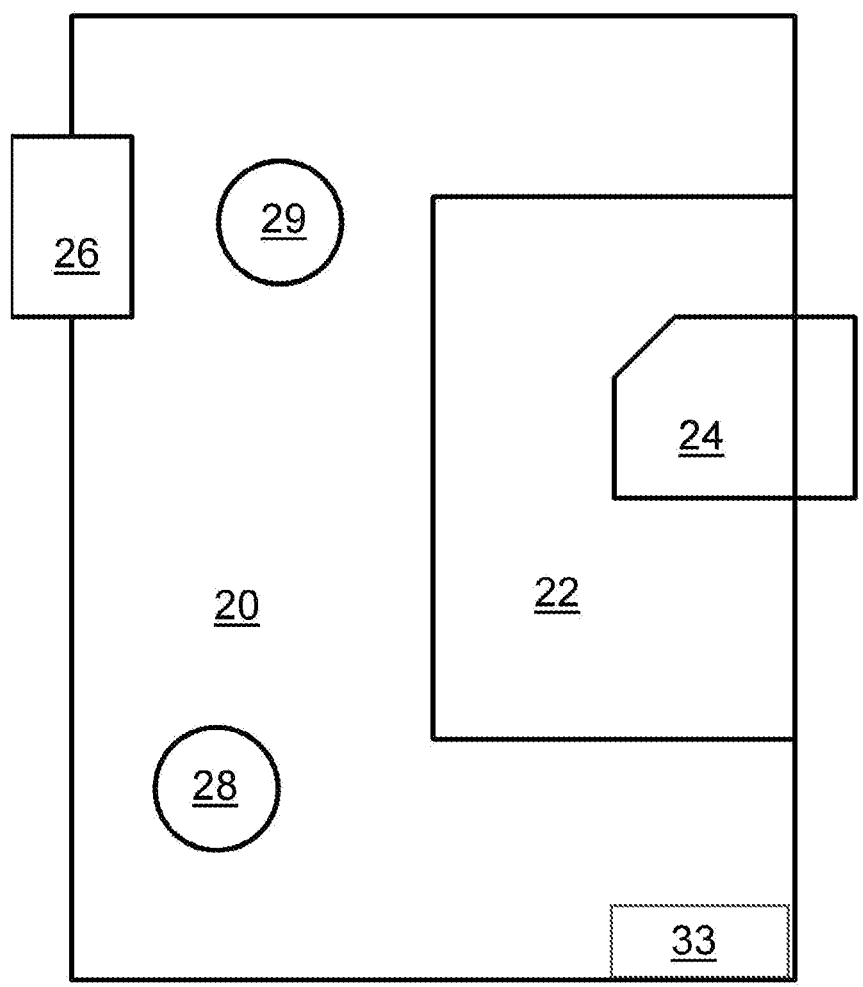
FIG. 2 is a schematic view of a printed circuit board of the photographic system for use on school buses according to an embodiment of the present invention.

FIG. 2 is a schematic view of a printed circuit board 20 of the photographic system for use on school buses according to an embodiment of the present invention. Referring now to FIG. 2, the printed circuit board is illustrated. The printed circuit board illustrated may be a printed circuit board located on either the first 20 or second container 20'. In one embodiment, only one PCB is included. In alternative embodiments, two identical PCBs are included in each container. In one embodiment, the printed circuit board comprises a microprocessor 22, a memory storage unit 24, an interface connection element 26, a transmitter 28, and a global positioning system (GPS) unit 29. The memory storage unit is any storage unit known in the art. In one embodiment, the memory storage unit is a memory card, such as a Secure Digital (SD) card, used for storing visual camera data, including motion and image data from the system during operation, which will be discussed in further detail below. In one embodiment, the interface connection element is used via the transmitter to connect to the Internet, as well known in the art, to send data. The GPS unit is used to determine the location of the system and violating vehicles during operation.

In embodiments where the first and second containers are in communication with each other, only one transmitter, interface connection element, microprocessor, and memory storage unit is required. For instance, the PCB and included components can be located in the first container, wherein the second container only includes a camera and a Doppler device. In other embodiments, some components, such as the memory storage unit may be provided on each container for data backup procedures. Further, in one embodiment, the PCB and electrical components may be hardwired into the school bus, such as near the instrument cluster to reduce possible weather damage to the electrical components. In this embodiment, only the cameras and Doppler devices need to be provided on the containers.

Figure 3B:
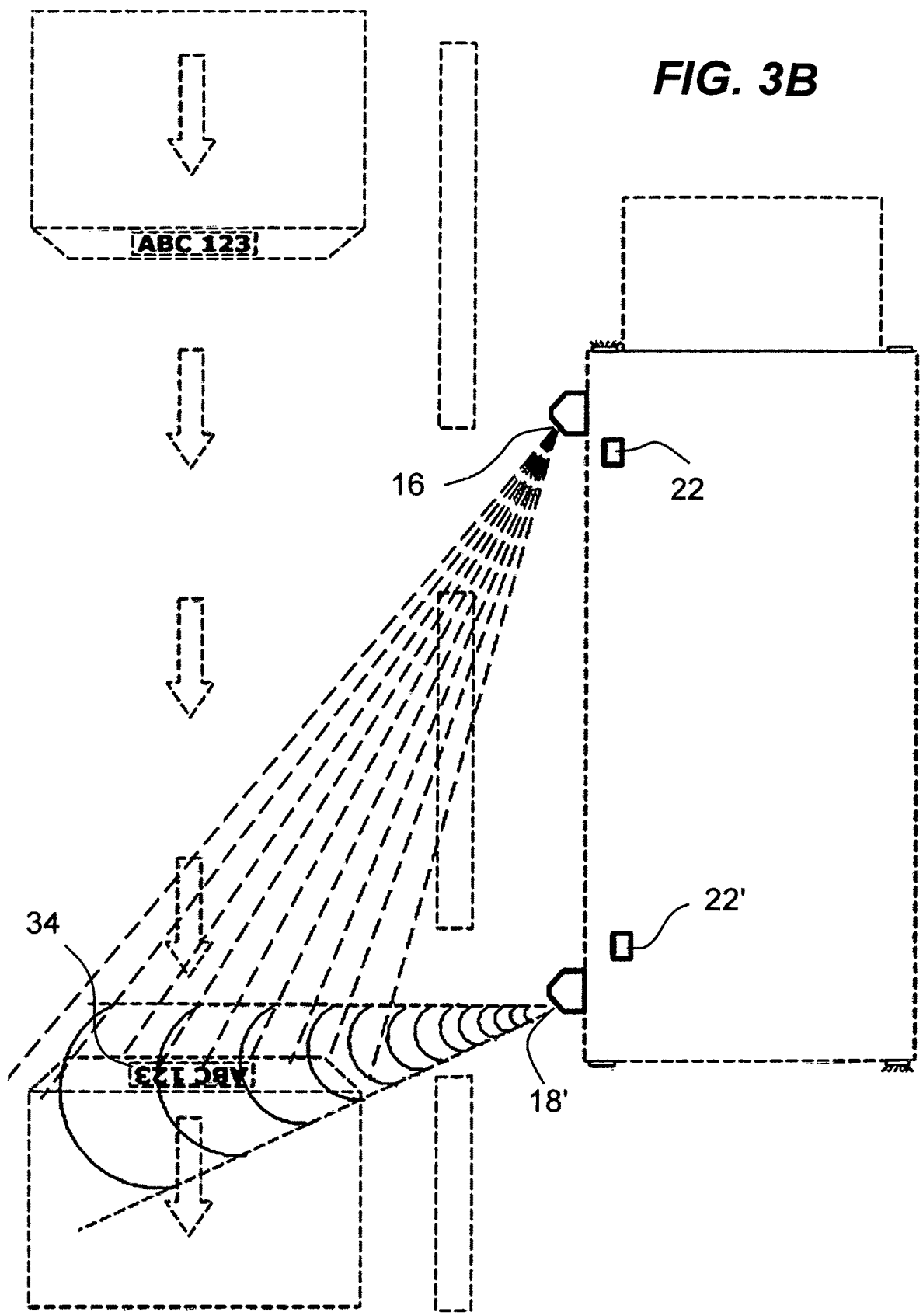

FIGS. 3A-D are top views showing the photographic system for use on school buses according to an embodiment of the present invention. Referring now to FIG. 3A, the photographic system is installed on a school bus 12. During operation, when the bus stops and the bus driver turns on or actuates flashers 30, positioned in the front and back of the school bus as well known in the art, a control unit 31 located in the school bus activates Doppler devices 18/18'. In one embodiment, the flashers are also positioned on a stop signal arm that extends from a side of the school bus when unloading and loading school children. In one embodiment, the control unit 31 in the school bus activates the Doppler devices when the stop signal arm is extended. It is well known in the art, that a number of flashers may be provided on a school bus, wherein the number of flashers may include different color flashing lights, wherein each color flashing lights indicate different traffic requirements. For example, yellow or amber lights may indicate caution, or that the school bus will be coming to a stop soon. Red flashing lights indicate to surrounding vehicles to stop. The flashers described herein, are of the red flashing variety. In some embodiments, the stop signal arm is not provided on the school bus, as only newer school buses include both the flashers and the stop signal arm.

As best seen in FIG. 3A, in one embodiment, when a bus has stopped and the driver has activated the flashers 30, 30', if a vehicle approaches from the front and does not stop as legally required, Doppler 18 sends a signal to the processor 22 associated with Doppler 18 to take a series of snapshots of a front plate 34 of the vehicle via camera 16' of the second container 14'. When Doppler 18' picks up the vehicle 32, as best seen in FIG. 3B, it transmits the information to microprocessor 22' which sends a request to camera 16 of the first container to take pictures of the rear plate 34 of the vehicle. The Doppler 18, 18' devices determine the speed of the vehicle and the GPS unit determines the GPS coordinates as well as time and date information, herein "time data". The GPS coordinates and time data may also be referred to as locational data. This collected data, including the speed of the vehicle, and locational data of the violation is processed and stored on the memory storage unit. The collected data is also sent over the Internet to local authorities, i.e. the police. In one embodiment, the Doppler devices can determine if a vehicle is not decelerating to a stop at a predetermined distance, at this time the signals to each microprocessor are sent.

Figure 3C:
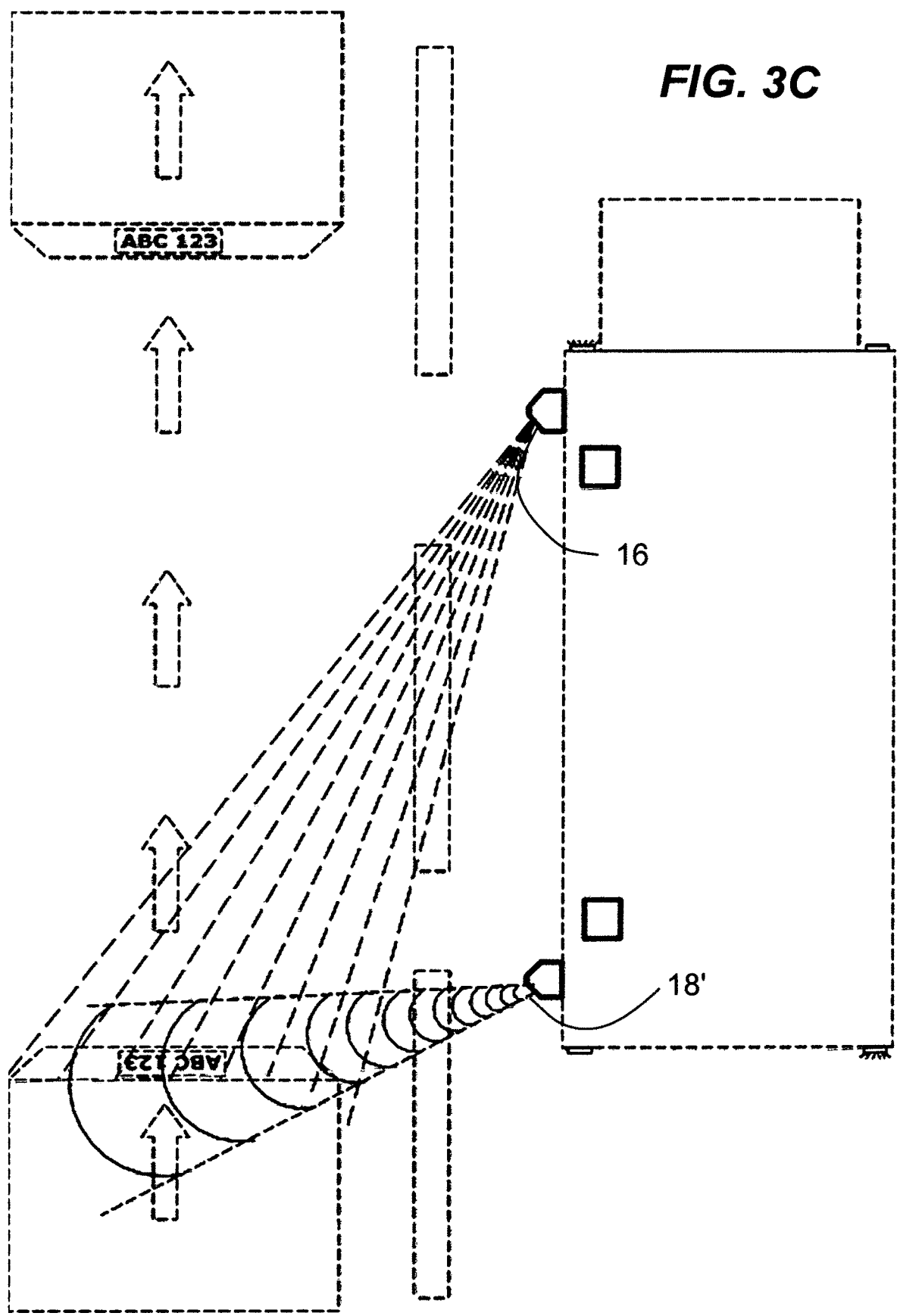
FIGS. 3C-3D are top views showing the two steps in the photographic sequence for vehicles coming in an opposite direction relative to FIGS. 3A-B and for use on school buses according to an embodiment of the present invention.
Figure 3D:
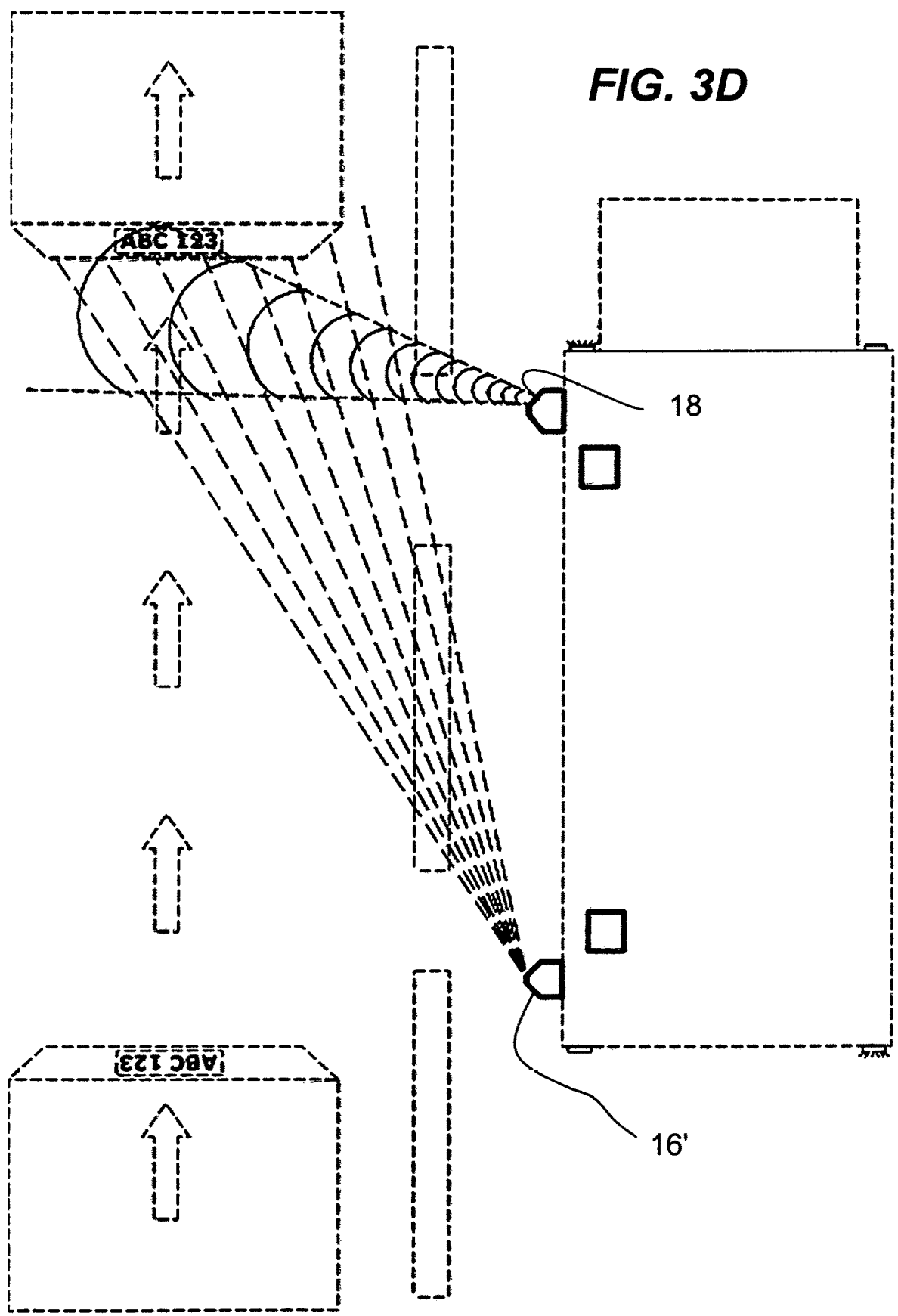

Referring now to FIG. 3C, vehicle 32 is approaching from the opposite direction, i.e. coming from behind the bus. In this scenario the same process is repeated, except that Doppler 18' sends a signal to microprocessor 22 to take a series of snapshots of a front plate 34 of the vehicle via camera 16 of the first container 14. When Doppler 18 picks up the vehicle 32, as seen in FIG. 3D, it transmits the information to microprocessor 22 which sends a request to camera 16' of the second container to take pictures of the rear plate of the vehicle. Similarly to the oncoming vehicle, in operation, the Doppler devices can determine if a vehicle is not decelerating to a stop at a predetermined distance when approaching from behind the bus, at this time the signals to each microprocessor are sent. The Doppler devices determine the speed of the vehicle and the GPS unit determines locational data. This collected data, including the speed of the vehicle and locational data is processed and stored on the memory storage unit. The collected data is also sent over the Internet to local authorities.

In one embodiment, video recordings may be captured along with the series of snapshots. In one embodiment, a plurality of cameras may be provided having up to 180 degrees of field of view corresponding to one side of the school bus. In alternative embodiments, a third and fourth container identical to the first and second containers may be provided on the other side of the school bus, useful in countries where the bidirectional traffic is left-hand traffic. Alternatively, the first and second containers may be positioned on the other side of the bus in these countries.

Figure 4A:
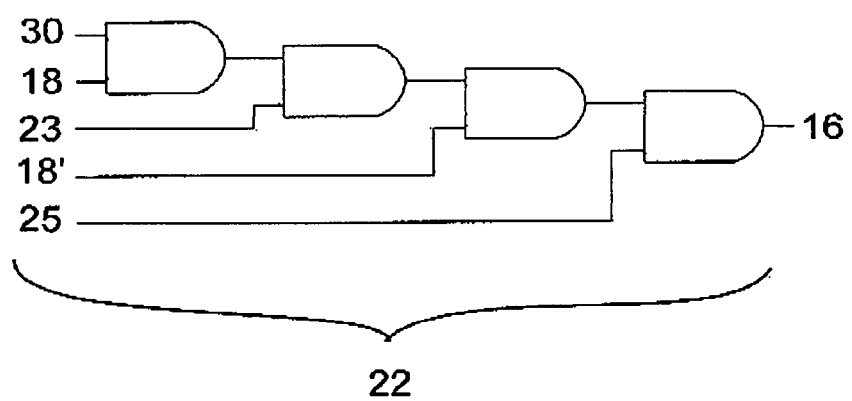
FIGS. 4A-B is a schematic view of a process carried out by the microprocessor of the photographic system for use on school buses according to an embodiment of the present invention.
Figure 4B:
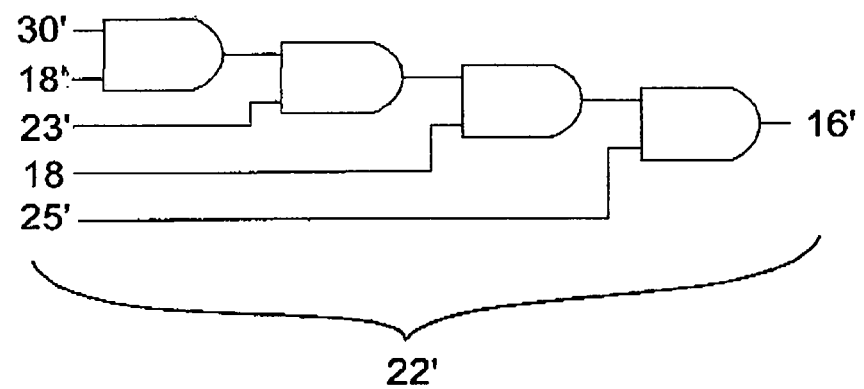

FIGS. 4A-B is a schematic view of a process carried out by the microprocessor of the photographic system for use on school buses according to an embodiment of the present invention. Referring now to FIGS. 4A-B, when the signals are sent to the microprocessor as previously mentioned, the microprocessor determines the best time 23/23' to trigger 25/25' the series of snapshots. In one embodiment, the best time is determined by the vehicle's speed as it approaches the school bus at the predetermined distance. As previously mentioned, the signals are initiated when the bus turns on or actuates flashers 30/30', activating Doppler devices 18/18'.

It is a particular advantage, that the best time to determine when to take the series of snapshots utilizes the Doppler device 18 in the first container and the Doppler device in the second container 14' working together. For instance, as illustrated in FIGS. 3A-B, Doppler device 18 detects an oncoming vehicle 32, and based on the vehicle's speed at a predetermined distance from the school bus 12, such as a predetermined distance from the front portion of the school bus 12, the microprocessor 22 determines the best time to trigger the series of snapshots via camera 16'. In one embodiment, the best time is when Doppler device 18 detects the vehicle 32. For an approaching vehicle 32 towards the back portion of the school bus 12, this scenario is reversed as illustrated in FIGS. 3B-D. That is, Doppler device 18' detects an approaching vehicle 32, and based on the vehicle's speed at a predetermined distance from the school bus 12, such as a predetermined distance from the back portion of the school bus 12, the microprocessor 22 determines the best time to trigger 25/25' the series of snapshots via camera 16. In one embodiment, the best time is when Doppler device 18' detects the vehicle 32. In one embodiment, the Doppler devices 18, 18' working together can be defined as when the closest Doppler device 18, 18' from an oncoming or approaching vehicle 32 first detects the vehicle 32 and sends a signal to the microprocessor 22 including the vehicle's speed information, then the furthest Doppler device 18, 18' from the vehicle 32 detects and sends a signal to the microprocessor 22 which triggers 25/25' the series of snapshots. That is, the Doppler devices 18, 18' work together with the microprocessor 22 to time the series of snapshots when the license plate 34 of the vehicle 32 is in the field of view of a camera 16, 16'.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art Such variations and alternate embodiments are contemplated, and can be made without departing from the spirit and scope of the invention. For instance, in one embodiment, only one container may be provided having two cameras facing opposite directions configured to take a series of snapshots towards both a front and rear license plate of a vehicle. The single container may be placed on a centralized location on one side of a school bus.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A photographic system for use on a school bus comprising:
   a control unit located in the school bus;
   at least one container connected to the control unit, wherein the at least one container includes a camera, a Doppler device, a microprocessor, a memory storage unit, and a GPS unit; and
   a number of flashers positioned on a front portion and a back portion of the school bus, wherein the number of flashers are connected to the control unit such that when the number of flashers are turned on by a school bus driver, the Doppler device is activated for vehicle motion detection;
   the Doppler device is configured to send signals to the microprocessor to initiate a series of snapshots of a license plate of a vehicle via the camera;
   wherein the license plate is a rear license plate;

the vehicle is Doppler device detects that the vehicle is an oncoming vehicle towards the front portion of the school bus or an approaching vehicle towards the back portion of the school bus and determines that, wherein the oncoming or approaching vehicle is not decelerating to a stop at a predetermined distance from the school bus.

2. The photographic system for use on a school bus of claim 1, wherein the at least one container is a first container and a second container.

3. The photographic system for use on a school bus of claim 2, wherein the first container is positioned on a first side of the school bus adjacent to the front portion of the school bus and the second container is positioned on the first side of the school bus adjacent to the back portion of the school bus.

4. The photographic system for use on a school bus of claim 1, wherein the Doppler device is configured to determine the vehicle's speed and the GPS unit is configured to determine locational data including GPS coordinates and time data.

5. The photographic system for use on a school bus of claim 1, wherein the series of snapshots, the vehicle's speed, and locational data are stored on the memory storage unit and sent over the Internet to local authorities via a transmitter.

6. The photographic system for use on a school bus of claim 1, wherein the microprocessor is configured to determine a best time to trigger the series of snapshots.

7. The photographic system for use on a school bus of claim 1, wherein the license plate is a front license plate.

8. A photographic system for use on a school bus comprising:
   a control unit located in the school bus;
      a first container and a second container each having a camera and a Doppler device connected to the control unit, wherein the first container is positioned on a first side of the school bus adjacent to a front portion of the school bus and the second container is positioned on the first side of the school bus adjacent to a back portion of the school bus; wherein at least one of the first or second containers include a microprocessor, a memory storage unit, and a GPS unit;
   a number of flashers positioned on the front portion and the back portion of the school bus, wherein the number of flashers are connected to the control unit such that when the number of flashers are turned on by a school bus driver, the Doppler devices are activated;
   the Doppler devices are configured to work together and send signals to the microprocessor when detecting an oncoming or approaching vehicle that is not decelerating at a predetermined distance from the school bus;
   the microprocessor is configured to determine a best time to initiate a series of snapshots of a license plate of the vehicle via the cameras, wherein the best time is based on the signals sent by the Doppler devices; and
   the Doppler devices are configured to determine the oncoming or approaching vehicle's speed and the GPS unit is configured to determine locational data including GPS coordinates and time data, wherein the series of snapshots, the vehicle's speed, and locational data are configured to be stored on the memory storage unit and sent over the Internet to local authorities via a transmitter.

9. A method of using a photographic system for use on a school bus when school bus flashers are actuated, the method comprising steps:
   (a) activating, with a control unit, at least one Doppler device;
   (b) determining, with the at least one Doppler device, if an approaching or an oncoming vehicle is not decelerating to a stop at a predetermined distance from the school bus;
   (c) determining, with a microprocessor, a best time to take a series of snapshots of the approaching or oncoming vehicle based on the vehicle's speed at the predetermined distance;
   (d) taking, with at least one camera, the series of snapshots of a license plate of the approaching or oncoming vehicle;
   (e) recording, with the at least one Doppler device, the vehicle's speed;
   (f) recording, with a GPS unit, the GPS coordinates and time data of the approaching or oncoming vehicle;
   (g) storing, with a memory storage unit, the series of snapshots, the vehicle's speed, the GPS coordinates, and the time data; and
   (h) transmitting, with a transmitter, the series of snapshots, the vehicle's speed, the GPS coordinates, and the time data to local authorities over the Internet.

10. The method of using a photographic system for use on a school bus when the flashers are turned on of claim 9, wherein in step (d), the license plate is a rear license plate.

11. The method of using a photographic system for use on a school bus when the flashers are turned on of claim 9, wherein in step (d), the license plate is a front license plate.

* * * * *